United States Patent
Ishikawa et al.

(10) Patent No.: US 9,417,718 B2
(45) Date of Patent: Aug. 16, 2016

(54) INPUT APPARATUS WITH FORCE FEEDBACK

(71) Applicant: Alps Electric Co., Ltd., Tokyo (JP)

(72) Inventors: Shinji Ishikawa, Miyagi-ken (JP);
Hiroshi Wakuda, Miyagi-ken (JP);
Yukiharu Hayashi, Miyagi-ken (JP);
Hajime Suzuki, Miyagi-ken (JP);
Yoshiyuki Iwasaki, Miyagi-ken (JP);
Tomohiro Shiine, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/730,978

(22) Filed: Jun. 4, 2015

(65) Prior Publication Data

US 2015/0357132 A1 Dec. 10, 2015

(30) Foreign Application Priority Data

Jun. 5, 2014 (JP) .................................. 2014-117075

(51) Int. Cl.
*H01H 13/50* (2006.01)
*G06F 3/0354* (2013.01)
*G06F 3/01* (2006.01)
*G06F 3/0338* (2013.01)

(52) U.S. Cl.
CPC ............ *G06F 3/03547* (2013.01); *G06F 3/016* (2013.01); *G06F 3/0338* (2013.01)

(58) Field of Classification Search
CPC ............................. G06F 3/03547; G06F 3/016
USPC ................ 200/251, 52 R, 406, 6 A, 512–513, 200/516–517, 521; 345/173
See application file for complete search history.

(56) References Cited

U.S. PATENT DOCUMENTS

| 4,639,668 | A | * | 1/1987 | Petit | .......................... | B25J 13/02 |
| | | | | | | 200/6 A |
| 4,977,298 | A | * | 12/1990 | Fujiyama | .............. | H01H 13/702 |
| | | | | | | 200/5 A |
| 8,264,465 | B2 | | 9/2012 | Grant et al. | | |
| 8,441,450 | B2 | * | 5/2013 | Degner | ............... | G06F 3/03547 |
| | | | | | | 178/18.01 |
| 2005/0056530 | A1 | * | 3/2005 | Oster | ................. | G05G 9/04792 |
| | | | | | | 200/6 A |
| 2006/0119586 | A1 | | 6/2006 | Grant et al. | | |

FOREIGN PATENT DOCUMENTS

JP 2008-516348 A 5/2008

* cited by examiner

*Primary Examiner* — Edwin A. Leon
(74) *Attorney, Agent, or Firm* — Brinks Gilson & Lione

(57) ABSTRACT

The input apparatus with force feedback includes an operating unit that includes an operating surface, a detecting unit that detects an operation performed on the operating surface, a drive member that drives the operating unit, an elastic member that elastically supports the operating unit, and a base unit that holds the drive member. The drive member includes a solenoid that vertically drives an actuator connected to the operating unit and a casing member that holds the solenoid and the actuator. The actuator vertically penetrates through the casing member. The actuator includes a first damping member able to be brought into contact with a lower surface of the operating unit and a second damping member disposed between a lower surface of the casing member and part of the actuator. The second damping member is brought into contact with the actuator and the casing member as the actuator is driven.

4 Claims, 16 Drawing Sheets

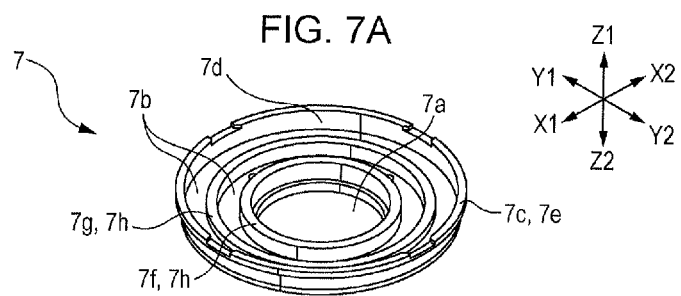
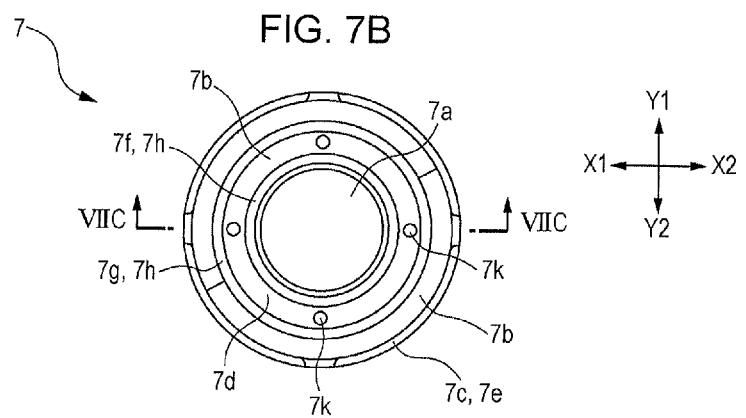
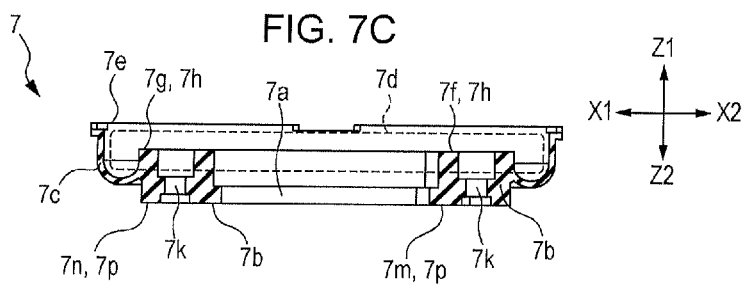

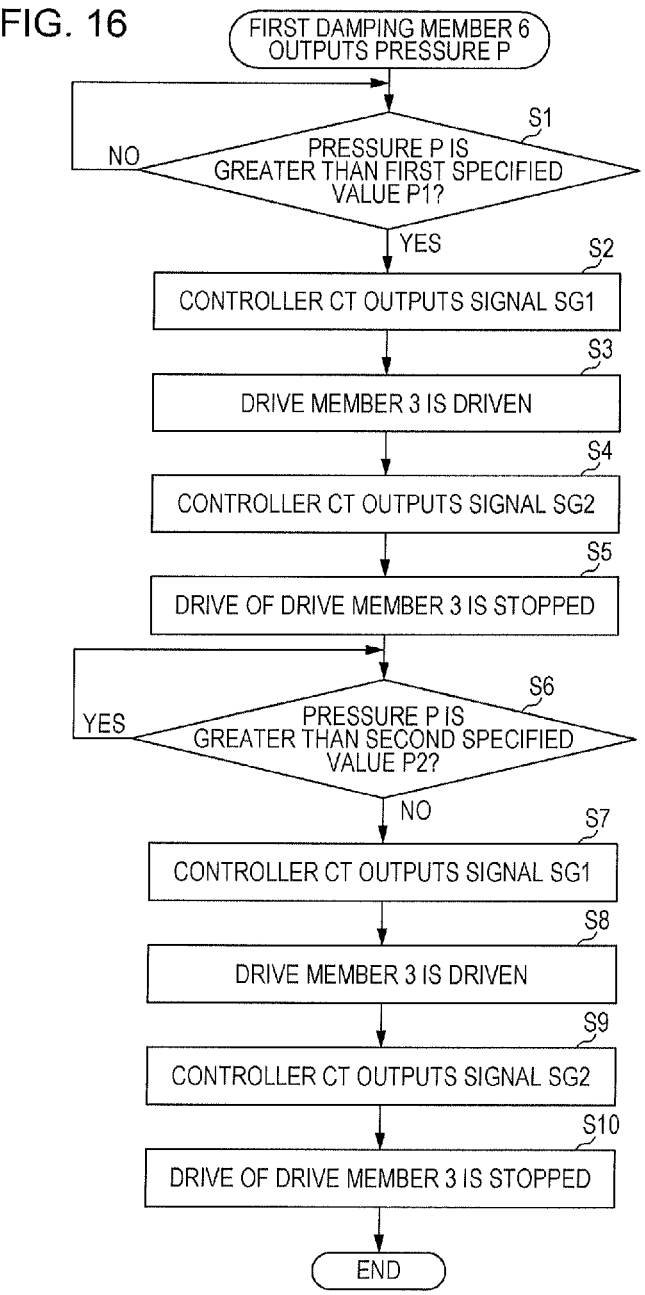

INPUT APPARATUS WITH FORCE FEEDBACK

CLAIM OF PRIORITY

This application claims benefit of priority to Japanese Patent Application No. 2014-117075 filed on Jun. 5, 2014, which is hereby incorporated by reference in its entirety.

BACKGROUND

1. Field of the Disclosure

The present disclosure relates to an input apparatus with force feedback, and in particular, relates to an input apparatus with force feedback that applies vibration with an actuator.

2. Description of the Related Art

Recently, input devices such as touch pads with which input operations can be performed by touching operating surfaces have been increasingly used. When operating such input devices, an operator cannot obtain an operational sensation that can be obtained by operating a switch apparatus or a variable resistor. Accordingly, the need exists for an input apparatus with force feedback that applies vibration to an operating surface when the input apparatus with force feedback is operated, so that the operator can obtain a quasi-operational sensation. Known examples of such an input apparatus with force feedback include an input apparatus with force feedback described in Japanese Unexamined Patent Application Publication (Translation of PCT Application) No. 2008-516348.

The input apparatus with force feedback described in PCT Japanese Translation Patent Publication No. 2008-516348 is described below with reference to FIG. 17. FIG. 17 is a schematic view of the structure of an input apparatus with force feedback 900 described in PCT Japanese Translation Patent Publication No. 2008-516348.

As illustrated in FIG. 17, a touch pad 916 is disposed on one or more springs 952 in the input apparatus with force feedback 900 described in POT Japanese Translation Patent Publication No. 2008-516348. Also, an actuator 954 is disposed below the touch pad 916. The actuator 954 can apply vibration to the touch pad 916. Thus, feedback to an operation performed by the operator is provided by applying vibration to the touch pad 916 and also to the operator operating the input apparatus with force feedback 900 through the touch pad 916.

The input apparatus with force feedback 900 has a structure in which vibration is applied by contact of the vertically moving actuator 954 with a lower surface of the touch pad 916 elastically held by the springs 952. Thus, the vibration of the springs 952 does not quickly converge even after drive of the actuator has been completed, and an operational sensation provided to the operator is unresponsive and dull.

SUMMARY

An input apparatus with force feedback includes an operating unit, a detecting unit, a drive member, an elastic member, and a base unit. The operating unit includes an operating surface, on which an operation is performed by bringing an operating body into contact with or moving the operating body close to the operating surface, on an upper surface of the operating unit. The detecting unit detects the operation performed on the operating surface by the operating body. The drive member is provided below the operating unit and drives the operating unit in a vertical direction. The elastic member is positioned below the operating unit and elastically urges the operating unit upward so as to support the operating unit. The base unit holds the drive member. The drive member includes an actuator connected to the operating unit, a solenoid that drives the actuator in the vertical direction, and a casing member that holds the solenoid and the actuator. The actuator penetrates through the casing member in the vertical direction and includes a first damping member and a second damping member. The first damping member has elasticity and is disposed at a position where the first damping member is brought into contact with a lower surface of the operating unit. The second damping member has elasticity and is disposed between an upper surface or a lower surface of the casing member and part of the actuator. The second damping member is brought into contact with at least one of the actuator and the casing member as the actuator is driven.

BRIEF DESCRIPTION OF THE DRAWINGS

FIG. 6A is a perspective view of the appearance of the drive member, and FIG. 6B is a side view of the drive member seen from a Y2 direction side illustrated FIG. 6A;

FIGS. 7A to 7C illustrate a second damping member according to the first embodiment, and, out of FIGS. 7A to 7C, FIG. 7A is a perspective view of the appearance of the second damping member, FIG. 7B is a plan view of the second damping member seen from a Z1 direction side illustrated in FIG. 7A, and FIG. 7C is a sectional view of the second damping member taken along line VIIC-VIIC illustrated in FIG. 7B;

FIG. 9A is a perspective view of the appearance of the operating unit, and FIG. 9B is a perspective view of the operating unit seen from a Z2 direction side illustrated FIG. 9A;

FIG. 10A is a perspective view of the appearance of the base unit, and FIG. 10B is an exploded perspective view of the base unit, an upper casing and a lower casing of which are separated from each other;

FIG. 11A is a plan view of the base unit seen from the Z1 direction side illustrated in FIG. 10A, and FIG. 11B is a side view of the base unit seen from an X1 direction side illustrated in FIG. 10A;

FIG. 15A is a schematic view of the second damping member in the initial state, FIG. 15B is a schematic view of the second damping member in a state in which the flat plate portion is moved to an upper position than that in the initial state, and FIG. 15C is a schematic view of the second damping member in a state in which the flat plate portion is moved to a lower position than that in the initial state;

FIG. 16 is a flowchart illustrating a procedure of feedback to an operator performed when a pressing operation is performed on the input apparatus with force feedback according to the first embodiment.

DESCRIPTION OF THE EXEMPLARY EMBODIMENTS

First Embodiment

An input apparatus with force feedback 100 according to a first embodiment is described below.

Figure 1:
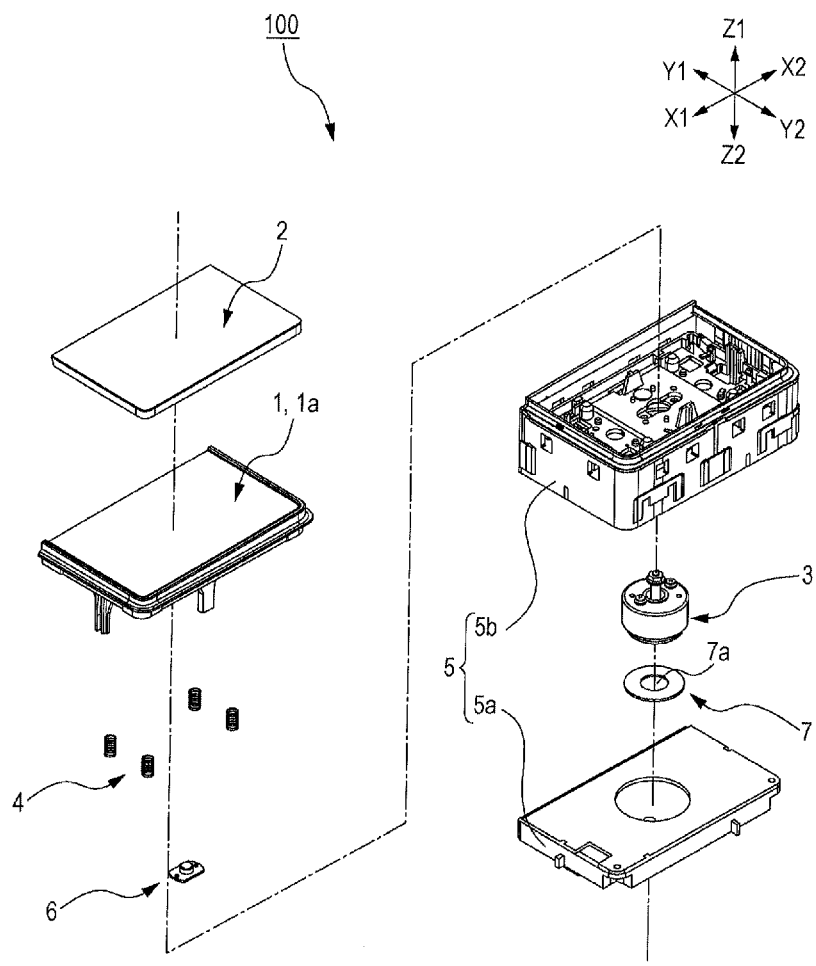
FIG. 1 is an exploded perspective view of the structure of an input apparatus with force feedback according to a first embodiment.
Figure 2:
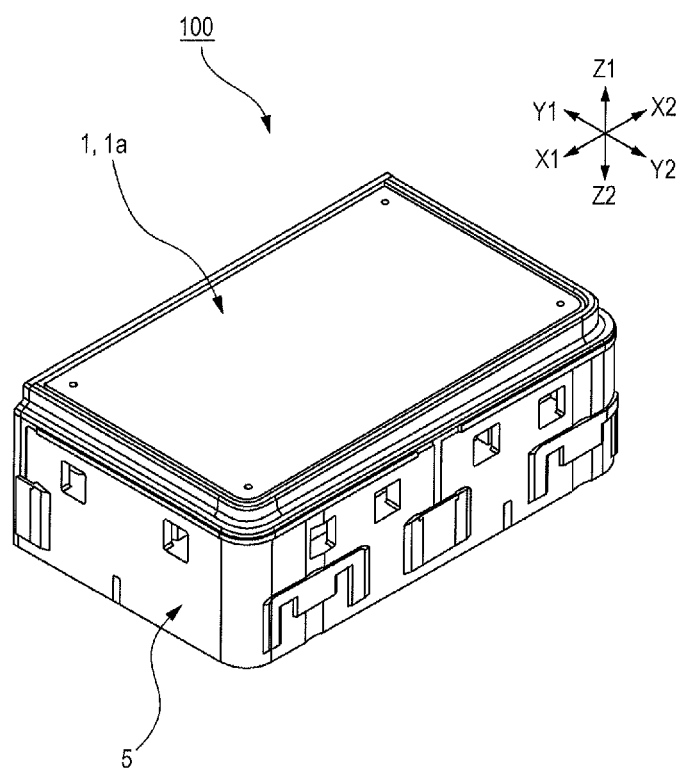
FIG. 2 is a perspective view of the appearance of the input apparatus with force feedback according to the first embodiment.
Figure 3:
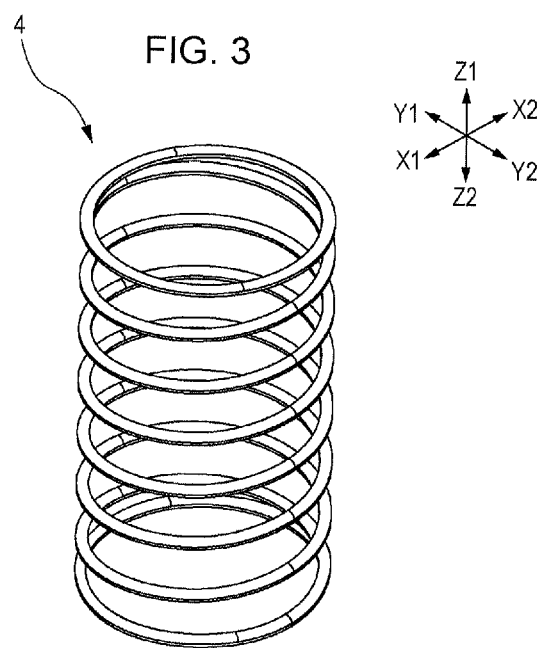
FIG. 3 is a perspective view of the appearance of one of elastic members according to the first embodiment.
Figure 4:
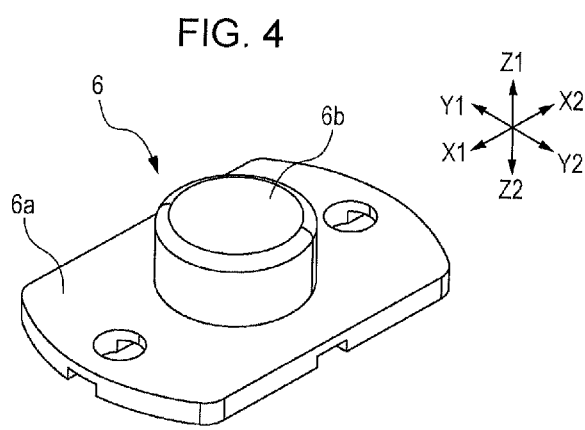
FIG. 4 is a perspective view of the appearance of a first damping member according to the first embodiment.
Figure 5:
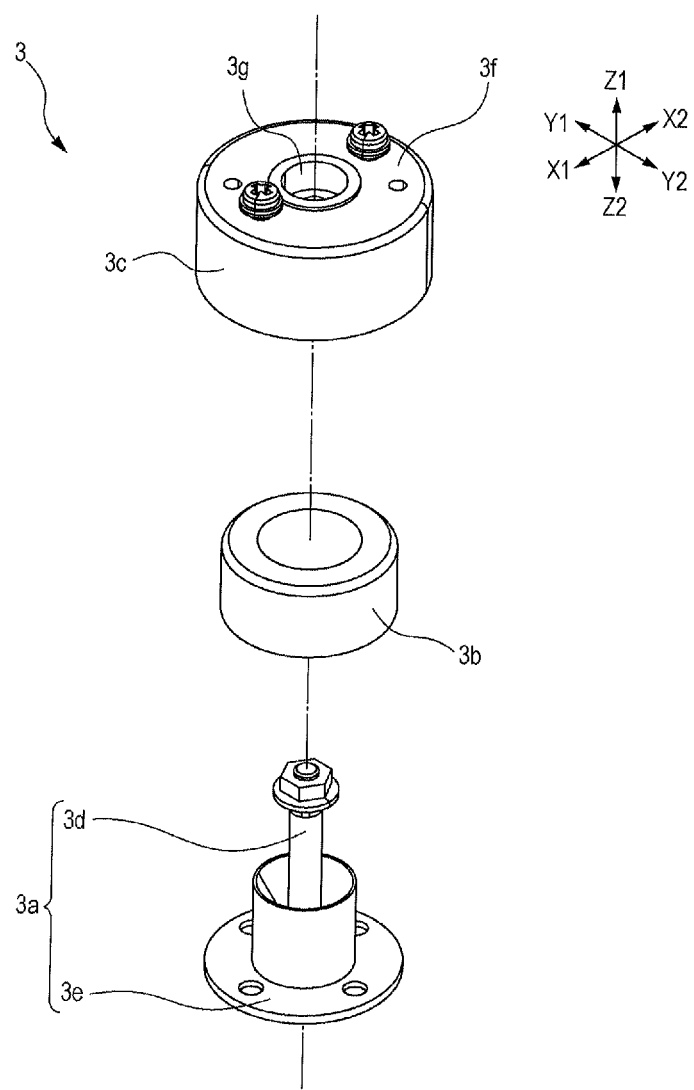
FIG. 5 is an exploded perspective view of the structure of a drive member according to the first embodiment.
Figure 6A:
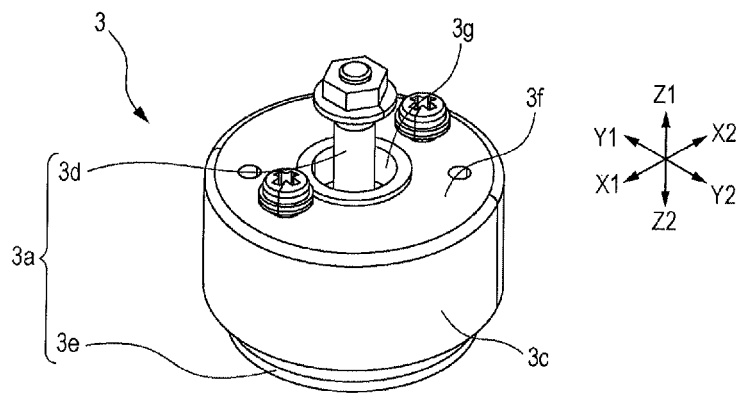
FIGS. 6A and 6B illustrate the drive member according to the first embodiment, and, out of FIGS. 6A and 6B.
Figure 6B:
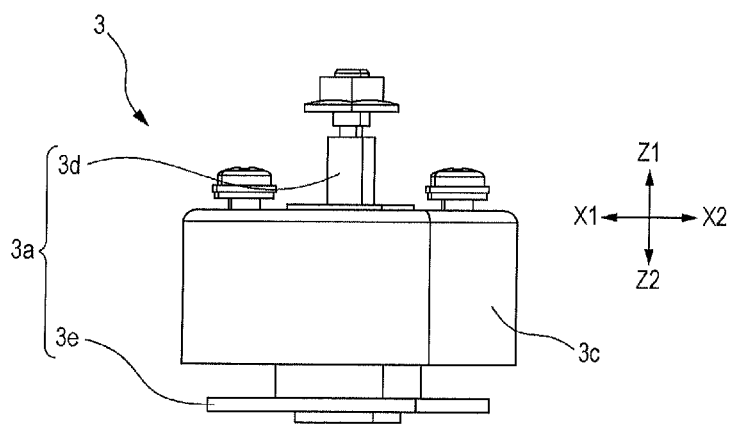
Figure 8:
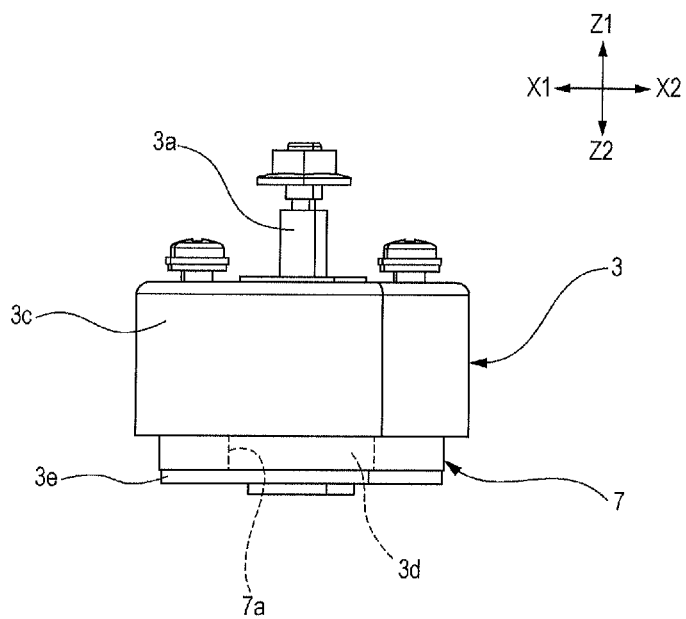
FIG. 8 is a side view of a state in which the drive member and the second damping member according to the first embodiment are integrated with each other.
Figure 9A:
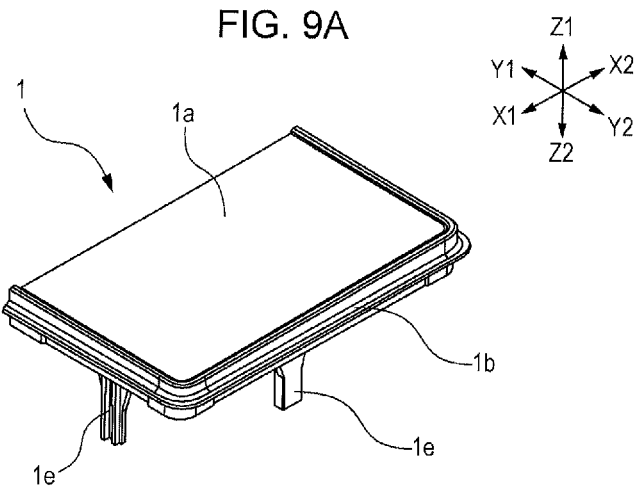
FIGS. 9A and 9B illustrate an operating unit according to the first embodiment, and, out of FIGS. 9A and 9B.
Figure 9B:
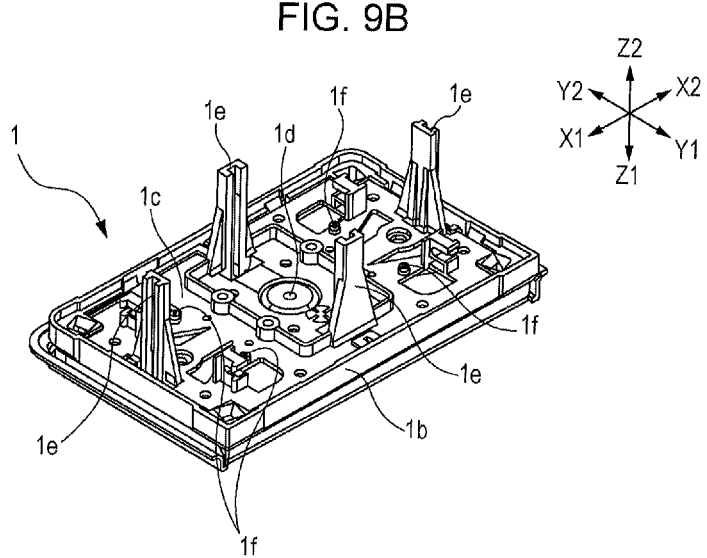
Figure 10A:
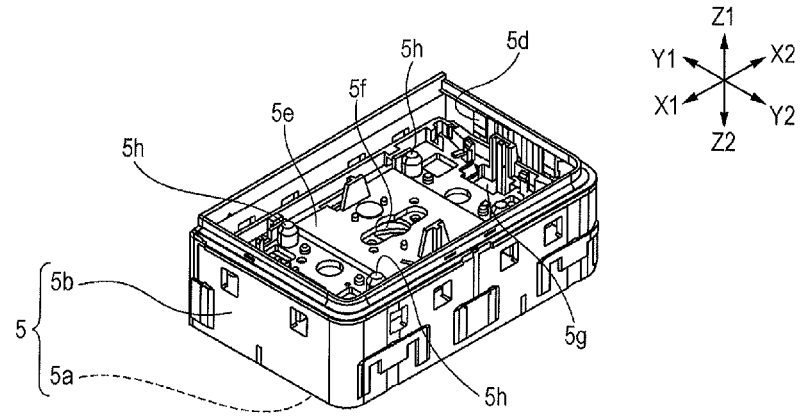
FIGS. 10A and 10B illustrate a base unit according to the first embodiment, and, out of FIGS. 10A and 10B.
Figure 10B:
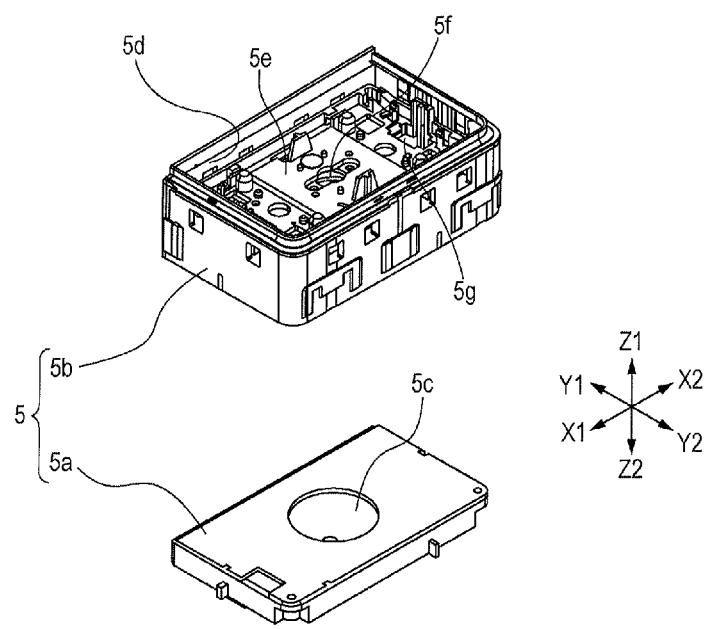
Figure 11A:
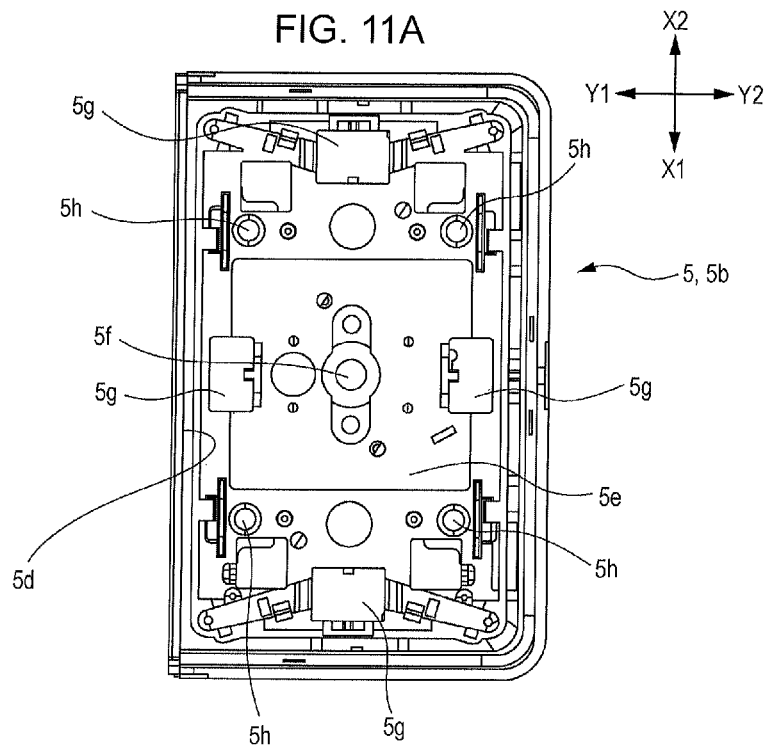
FIGS. 11A and 11B illustrate the base unit according to the first embodiment, and, out of FIGS. 11A and 11B.
Figure 11B:
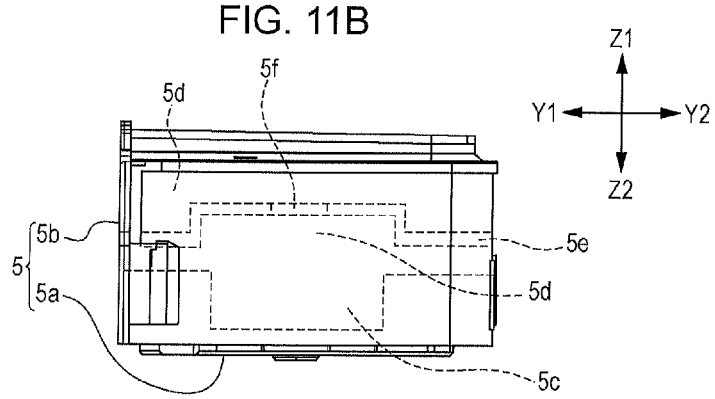

Initially, the structure of the input apparatus with force feedback 100 according to the first embodiment is described with reference to FIGS. 1 to 11B. FIG. 1 is an exploded perspective view of the structure of the input apparatus with force feedback 100 according to the first embodiment. FIG. 2 is a perspective view of the appearance of the input apparatus with force feedback 100 according to the first embodiment. FIG. 3 is a perspective view of the appearance of one of elastic members 4 according to the first embodiment. FIG. 4 is a perspective view of the appearance of a first damping member 6 according to the first embodiment. FIG. 5 is an exploded perspective view of the structure of a drive member 3 according to the first embodiment. FIGS. 6A and 6B illustrate the drive member 3 according to the first embodiment, and, out of FIGS. 6A and 6B, FIG. 6A is a perspective view of the appearance of the drive member 3, and FIG. 6B is a side view of the drive member 3 seen from a Y2 direction side illustrated FIG. 6A. FIGS. 7A to 7C illustrate a second damping member 7 according to the first embodiment, and, out of FIGS. 7A to 7C, FIG. 7A is a perspective view of the appearance of the second damping member 7, FIG. 7B is a plan view of the second damping member 7 seen from a Z1 direction side illustrated in FIG. 7A, and FIG. 7C is a sectional view of the second damping member 7 taken along line VIIC-VIIC in FIG. 7B. FIG. 8 is a side view of a state in which the drive member 3 and the second damping member 7 according to the first embodiment are integrated with each other. FIGS. 9A and 9B illustrate an operating unit 1 according to the first embodiment, and, out of FIGS. 9A and 9B, FIG. 9A is a perspective view of the appearance of the operating unit 1, and FIG. 9B is a perspective view of the operating unit 1 seen from a Z2 direction side illustrated FIG. 9A. FIGS. 10A and 10B illustrate a base unit 5 according to the first embodiment, and, out of FIGS. 10A and 10B, FIG. 10A is a perspective view of the appearance of the base unit 5, and FIG. 10B is an exploded perspective view of the base unit 5, a lower casing 5a and an upper casing 5b of which are separated from each other. FIGS. 11A and 11B illustrate the base unit 5 according to the first embodiment, and, out of FIGS. 11A and 11B, FIG. 11A is a plan view of the base unit 5 seen from the Z1 direction side illustrated in FIG. 10A, and FIG. 11B is a side view of the base unit 5 seen from an X1 direction side illustrated in FIG. 10A.

As illustrated in FIG. 1, the input apparatus with force feedback 100 includes the operating unit 1, a detecting unit 2, the drive member 3, the elastic members 4, the base unit 5, the first damping member 6, and the second damping member 7. The input apparatus with force feedback 100 is formed to have a shape as illustrated in FIG. 2. An input operation can be performed by bringing an operating body (such as a finger, not illustrated) into contact with or moving the operating body close to the operating unit 1 provided on an upper portion of the input apparatus with force feedback 100.

The elastic members 4 have elasticity. The elastic members 4 according to the first embodiment are four extension springs as illustrated in FIG. 3.

The first damping member 6 is formed of a synthetic rubber material and has elasticity. As illustrated in FIG. 4, the first damping member 6 includes a plate portion 6a having a flat plate shape and a contact portion 6b upwardly projecting from a central portion of an upper surface (surface on the Z1 direction side) of the plate portion 6a. A pressure sensor (not illustrated) is disposed inside the contact portion 6b so as to allow a pressure value applied to the contact portion 6b from the outside to be detected.

As illustrated in FIG. 5, the drive member 3 includes an actuator 3a, a solenoid 3b, and a casing member 3c. The actuator 3a is formed of a ferromagnetic metal material. The actuator 3a preferably includes a columnar column portion 3d and a flat plate portion 3e, which is formed at a lower end portion (on the Z2 direction side) of the column portion 3d and has a flat circular shape extending from the column portion 3d around the column portion 3d. The solenoid 3b is a coil formed of a metal wire to have a cylindrical shape. The column portion 3d of the actuator 3a can be inserted through the solenoid 3b. The casing member 3c has a cylindrical shape and is formed of a metal plate. A space is provided in the casing member 3c so as to allow the solenoid 3b and part of the column portion 3d to be contained in the space. A top plate portion 3f is provided on an upper end portion (on the Z1 direction side) of the casing member 3c so as to close an opening. The top plate portion 3f has a through hole 3g formed at the center thereof. The through hole 3g has such a size that the column portion 3d can be inserted through the through hole 3g. The solenoid 3b and part of the column portion 3d are contained in the casing member 3c with the column portion 3d of the actuator 3a inserted through the solenoid 3b. The actuator 3a is disposed such that the column portion 3d preferably vertically extends through the casing member 3c, and both ends of the column portion 3d are exposed from the casing member 3c. The casing member 3c holds the solenoid 3b and the actuator 3a, which are disposed as described above. Thus, the drive member 3 as illustrated in FIGS. 6A and 6B is formed. The flat plate portion 3e of the actuator 3a is kept separated from a lower surface of the casing member 3c and disposed along the lower surface of the casing member 3c. The solenoid 3b can vertically drive the actuator 3a by a current flowing through the solenoid 3b.

The second damping member 7 is formed of a synthetic rubber material and has elasticity. As illustrated in FIG. 1, the second damping member 7 has a circular annular shape and preferably has an insertion hole 7a that vertically penetrates through the second damping member 7. The insertion hole 7a is disposed at the center of the second damping member 7. As illustrated in FIGS. 7A to 7C, the second damping member 7 preferably has a base portion 7b and a skirt portion 7c. The base portion 7b preferably has a disc shape and has the insertion hole 7a at its central portion. The skirt portion 7c preferably continuously extends toward one side in vertical direction (upper side according to the first embodiment, that is, in the Z1 direction) from an outer circumferential portion of the base portion 7b. Also, the second damping member 7 preferably has a hollow portion 7d that is covered by the base portion 7b and the skirt portion 7c and has a substantially dome shape. According to the first embodiment, the skirt portion 7c continuously extends upward from the outer circumferential portion of the base portion 7b. Thus, the hollow portion 7d has the inverted substantially dome shape. The skirt portion 7c has first contact portions 7e. The first contact portions 7e have an annular shape in plan view seen from the Z1 direction side. The first contact portions 7e are formed at an end portion of the skirt portion 7c on a side away from the base portion 7b. An inner wall portion (first inner wall portion 7f) and an outer wall portion (first outer wall portion 7g) are provided on the base portion 7b so as to be perpendicular to the base portion 7b in the hollow portion 7d. The first inner wall portion 7f has an annular shape so as to surround the insertion hole 7a in plan view seen from the Z1 direction side. The first outer wall portion 7g is formed to have an annular shape between the skirt portion 7c and the first inner wall portion 7f so as to surround the first inner wall portion 7f in plan view. Second contact portions 7h are formed at end portions of the first inner wall portion 7f and the first outer wall portion 7g on the side away from the base portion 7b (on the Z1 direction side). The second contact portions 7h are formed at positions closer to the base portion 7b than the first contact portions 7e. The second contact portion 7h provided on the first inner wall portion 7f and the second contact portion 7h provided on the first outer wall portion 7g are at the same level relative to the base portion 7b. Furthermore, a second inner wall portion 7m and a second outer wall portion 7n are respectively provided at a position corresponding to the first inner wall portion 7f and at a position corresponding to the first outer wall portion 7g on the base portion 7b so as to be perpendicular to the base portion 7b. The second inner wall portion 7m and the second outer wall portion 7n are disposed on a side opposite to the hollow portion 7d and have respective annular shapes in plan view seen from the Z2 direction side. Third contact portions 7p are formed at end portions of the second inner wall portion 7m and the second outer wall portion 7n on the side away from the base portion 7b (on the Z2 direction side). The third contact portion 7p provided on the second inner wall portion 7m and the third contact portion 7p provided on the second outer wall portion 7n are at the same level relative to the base portion 7b. Furthermore, four through holes 7k are formed in a region of the base portion 7b interposed between the first inner wall portion 7f and the first outer wall portion 7g so as to be equally spaced apart along a single circumference. The second damping member 7 has such a thickness that the second damping member 7 can be disposed between the lower surface of the casing member 3c and the flat plate portion 3e of the drive member 3. Although the second damping member 7 has a circular annular shape according to the first embodiment, this does not limit the shape of the second damping member 7. For example, the outer shape of the second damping member 7 may have a regular-octagonal annular shape, an elliptical annular shape, or the like.

According to the first embodiment, the second damping member 7 is integrated with the drive member 3. As illustrated in FIG. 8, the second damping member 7 is preferably disposed between the lower surface of the casing member 3c and the flat plate portion 3e, which is part of the actuator 3a, in a state in which the column portion 3d is inserted through the insertion hole 7a. Despite this, since the second damping member 7 has elasticity, the actuator 3a can be driven against an elastic force of the second damping member 7.

The detecting unit 2 is a capacitive sensor that can detect changes in capacitance. As illustrated in FIG. 1, the detecting unit 2 has a sheet shape.

The operating unit 1 is formed of a synthetic resin material and, as illustrated in FIGS. 9A and 9B, has a rectangular flat plate shape. The operating unit 1 has a rectangular flat plate-shaped base portion 1b. An upper surface (surface on the Z1 direction side) of the base portion 1b is smooth. The operating unit 1 includes an operating surface 1a on its upper surface. An operation can be performed on the operating surface 1a by bringing an operating body OB into contact with or moving the operating body OB close to the operating surface 1a. A connecting surface 1c is formed on a side opposite to the operating surface 1a. The connecting surface 1c has a connecting portion 1d at its center. The connecting portion 1d can be connected to the column portion 3d of the drive member 3. Also, guide pins 1e are formed on the connecting surface 1c so as to project downward from the connecting surface 1c. Four guide pins 1e are provided near an outer periphery of the connecting surface 1c. Each of the guide pins 1e is disposed at a corresponding one of the following positions: that is, positions that face each other with the connecting portion 1d interposed therebetween and correspond to the midpoints of the long sides of the connecting surface 1c and positions that face each other with the connecting portion 1d interposed therebetween and correspond to the midpoints of the short sides of the connecting surface 1c. Also, holding pins 1f are formed on the connecting surface 1c so as to project downward from the connecting surface 1c. The holding pins 1f have a columnar shape and have such a size that the holding pins 1f can be inserted into the elastic members 4. The holding pins 1f are each disposed at a corresponding one of positions that are corners of the rectangular having the center at the connecting portion 1d in plan view when the connecting surface 1c is seen from below. The long sides of the rectangular formed by four holding pins 1f are parallel to the long sides of the connecting surface 1c. A hollow is formed in the base portion 1b so that the detecting unit 2 can be disposed in the base portion 1b. According to the first embodiment, the detecting unit 2 is disposed along the operating surface 1a and extends over a region corresponding to an entire region of the operating surface 1a in the base portion 1b. Changes in capacitance caused by bringing the operating body OB into contact with or moving the operating body OB close to the operating surface 1a can be detected in a state in which the operating surface 1a is interposed between the detecting unit 2 and the operating body OB.

The base unit 5 is formed of a synthetic resin material and, as illustrated in FIGS. 10A and 10B, has a box shape. The base unit 5 includes a lower casing 5a and an upper casing 5b stacked on an upper portion of the lower casing 5a. The lower casing 5a has a recessed shape having a flat plate at its upper surface. The lower casing 5a has a drive member accommodating portion 5c, in which the casing member 3c of the drive member 3 can be disposed. The upper casing 5b has a hollow portion 5d having a hollow. The upper and lower direction sides (on the Z1 and Z2 direction sides) of the hollow portion 5d are open. A partitioning plate 5e that vertically partitions the hollow portion 5d is provided in the hollow portion 5d. As illustrated in FIGS. 11A and 11B, the partitioning plate 5e has an insertion hole 5f that penetrates through the partitioning plate 5e at the central portion of the partitioning plate 5e. The insertion hole 5f has such a size that the actuator 3a of the drive member 3 can be inserted through the insertion hole 5f. The partitioning plate 5e also has guide holes 5g penetrating through the partitioning plate 5e and having such a size that the guide pins 1e of the operating unit 1 can be inserted through the guide holes 5g. Each of the guide holes 5g is provided at a corresponding one of the following positions: that is, positions that face each other with the insertion hole 5f interposed therebetween and correspond to the midpoints of the long sides of the partitioning plate 5e and positions that face each other with the insertion hole 5f interposed therebetween and correspond to the midpoints of the short sides of the partitioning plate 5e. The positions of four guide holes 5g with respect to the insertion hole 5f correspond to the positions where the four guide pins 1e are disposed with respect to the connecting portion 1d in the operating unit 1. Also, the partitioning plate 5e has elastic member holding portions 5h that project upward. The elastic member holding portions 5h have a columnar shape and have such a size that the elastic member holding portions 5h can be inserted into the elastic members 4. The elastic member holding portions 5h are each disposed at a corresponding one of positions that are corners of the rectangular having the center at the insertion hole 5f in plan view when the partitioning plate 5e is seen from below. The long sides of the rectangular formed by four elastic member holding portions 5h are parallel to the long sides of the partitioning plate 5e. By arranging the lower casing 5a and the upper casing 5b formed as described above such that the upper casing 5b is stacked on the lower casing 5a and securing the upper casing 5b and lower casing 5a to each other, the base unit 5 is formed. A space in which the casing member 3c of the drive member 3 can be disposed is provided in a region formed on the lower side of the partitioning plate 5e in the hollow portion 5d.

Figure 12:
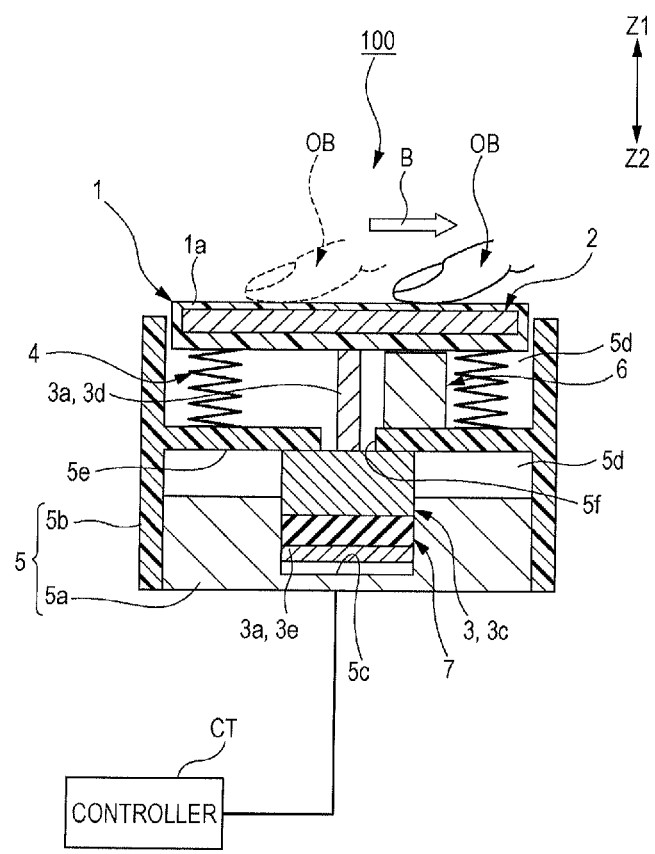
FIG. 12 is a schematic sectional view of the structure of the input apparatus with force feedback according to the first embodiment in an initial state.

Next, the structure of the input apparatus with force feedback 100 is described with reference to FIG. 12. FIG. 12 is a schematic sectional view of the structure of the input apparatus with force feedback 100 according to the first embodiment in an initial state. For ease of description, the shapes of the elements, the positional relationships between the elements, and so forth illustrated in FIG. 12 may be different from the actual structure. For the detailed portions of the second damping member 7, FIGS. 7A to 7C are to be referred to.

As illustrated in FIG. 12, the drive member 3 and the second damping member 7 are integrated with each other as described above. The other side of the vertical direction of the base portion 7b of the second damping member 7 is in contact with one of the flat plate portion 3e and the casing member 3c, and the skirt portion 7c is disposed such that the skirt portion 7c can be brought into contact with the other of the flat plate portion 3e and the casing member 3c. According to the first embodiment, the third contact portions 7p of the base portion 7b are in contact with the flat plate portion 3e, and the skirt portion 7c (first contact portions 7e) are in contact with the casing member 3c. The second contact portions 7h can be brought into contact with the casing member 3c. The upper casing 5b holds the drive member 3 by fastened the drive member 3 to the upper casing 5b with screws in a state in which the column portion 3d of the actuator 3a is inserted through the insertion hole 5f from the lower side (Z2 direction side) of the upper casing 5b. The casing member 3c side of the drive member 3 is inserted into the drive member accommodating portion 5c of the lower casing 5a, thereby the lower casing 5a is engaged with the lower portion of the upper casing 5b. Thus, the base unit 5 is made. Next, the first damping member 6 is secured to an upper surface of the partitioning plate 5e. Next, the elastic members 4 having a circular annular shape are disposed on the partitioning plate 5e in a state in which the elastic member holding portions 5h (see FIGS. 11A and 11B) are inserted into the elastic members 4 on one end sides of the elastic members 4. Next, the operating unit 1 is disposed with the operating surface 1a facing upward (Z1 direction) so as to cover an opening of the hollow portion 5d. The operating unit 1 disposed as described above is connected to the base unit 5 with the elastic members 4 interposed therebetween by inserting the guide pins 1e (see FIGS. 9A and 9B) into the guide holes 5g (see FIG. 11A) provided in the partitioning plate 5e such that the guide pins 1e are movable relative to the guide holes 5g and inserting the holding pins 1f (see FIG. 9B) into the elastic members 4 on the other end sides of the elastic members 4. Furthermore, the actuator 3a of the drive member 3 provided below the operating unit 1 is connected to the connecting portion 1d (see FIG. 9B) of the operating unit 1. In the initial state in which pressing operation is not performed on the operating surface 1a, power is not supplied to the drive member 3 and the actuator 3a is held such that the actuator 3a can be vertically moved. Thus, in the initial state, the operating unit 1 is upwardly elastically supported by the elastic members 4 disposed below the operating unit 1. The operating unit 1 elastically supported as described above can be vertically (Z1-Z2 direction) moved (vibrated) against elastic forces of the elastic members 4 when power is supplied to the drive member 3 as the actuator 3a is driven. The first damping member 6 below the operating unit 1 is disposed at a position where the first damping member 6 can be brought into contact with the lower surface of the operating unit 1 when the operating unit 1 is vertically moved. Specifically, the first damping member 6 is disposed at a position where, when the actuator 3a is positioned near a lowest end of the stroke of the actuator 3a in the vertical movement of the actuator 3a, the first damping member 6 is brought into contact with and compressed by the lower surface of the operating unit 1. Thus, the input apparatus with force feedback 100 is configured. In the case where the input apparatus with force feedback 100 is mounted in actual equipment, the input apparatus with force feedback 100 is connected to a controller CT that includes a central processing unit (CPU) and so forth, so that the controller CT issues instructions to various components in accordance with input operations performed on the input apparatus with force feedback 100.

Figure 13:
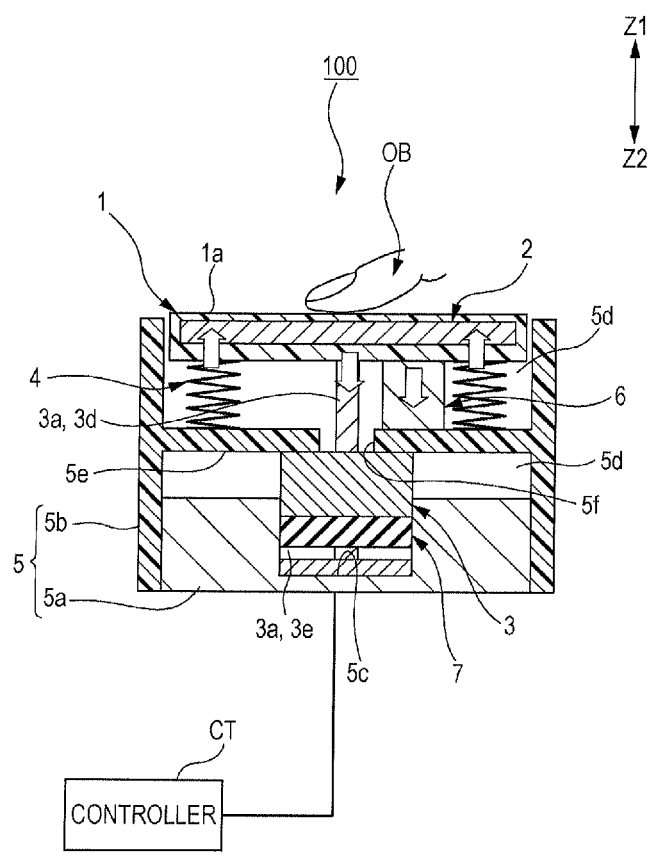
FIG. 13 is a schematic sectional view of the structure of the input apparatus with force feedback according to the first embodiment in a state in which the operating unit of the input apparatus with force feedback is moved down.
Figure 14:
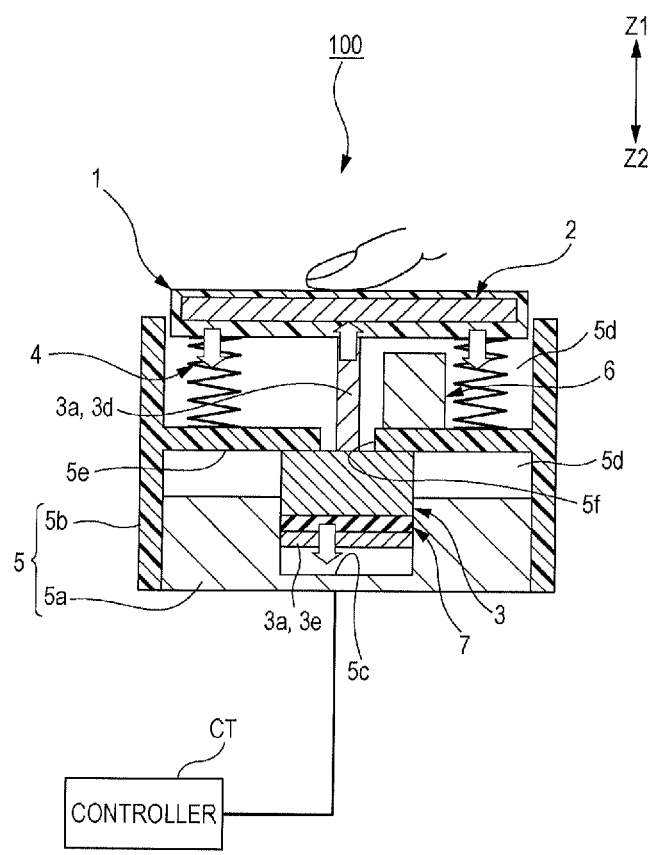
FIG. 14 is a schematic sectional view of the structure of the input apparatus with force feedback according to the first embodiment in a state in which the operating unit of the input apparatus with force feedback is moved up.
Figure 15A:
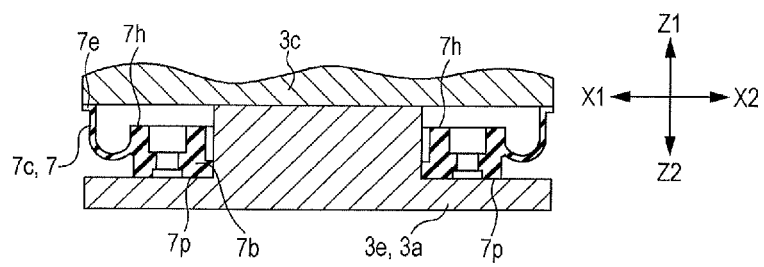
FIGS. 15A to 15C are schematic views illustrating a movement of the second damping member when the actuator according to the first embodiment is driven, and, out of FIGS. 15A to 15C.
Figure 15B:
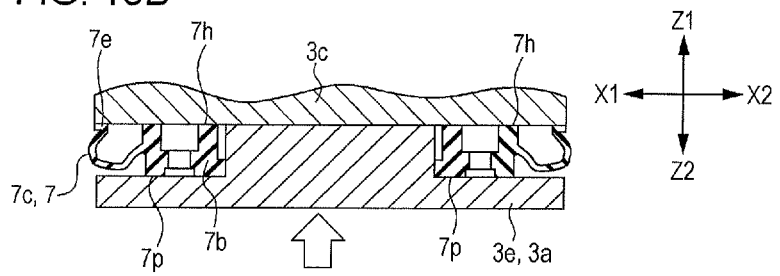
Figure 15C:
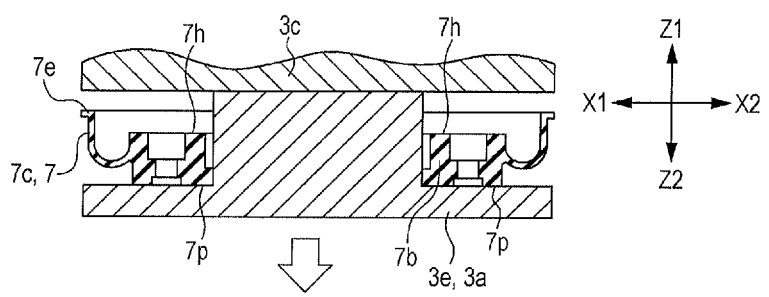
Figure 17:
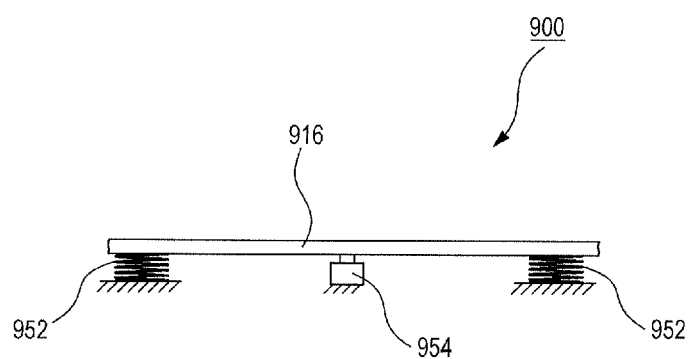
FIG. 17 is a schematic view of the structure of an input apparatus with force feedback described in PCT Japanese Translation Patent Publication No. 2008-516348.

Next, operations and a method of operating the input apparatus with force feedback 100 are described with reference to FIGS. 12 to 16. FIG. 13 is a schematic sectional view of the structure of the input apparatus with force feedback 100 according to the first embodiment in a state in which the operating unit 1 of the input apparatus with force feedback 100 is moved down. FIG. 14 is a schematic sectional view of the structure of the input apparatus with force feedback 100 according to the first embodiment in a state in which the operating unit 1 of the input apparatus with force feedback 100 is moved up. FIGS. 15A to 15C are schematic views illustrating a movement of the second damping member 7 when the actuator 3a according to the first embodiment is driven, and, out of FIGS. 15A to 15C, FIG. 15A is a schematic view of the second damping member 7 in the initial state, FIG. 15B is a schematic view of the second damping member 7 in a state in which the flat plate portion 3e is moved to an upper position than that in the initial state, and FIG. 15C is a schematic view of the second damping member 7 in a state in which the flat plate portion 3e is moved to a lower position than that in the initial state. FIG. 16 is a flowchart illustrating a procedure of feedback to an operator performed when a pressing operation is performed on the input apparatus with force feedback 100 according to the first embodiment.

In the initial state in which a pressing operation is not performed on the operating surface 1a, an operation can be performed by, for example, bringing the operating body OB, which is a finger of the operator, into contact with or moving the operating body OB closed to the operating surface 1a as illustrated in FIG. 12 (hereafter, description of the bringing of the operating body OB into contact with the operating surface 1a refers to any one of the case of bringing the operating body OB into contact with and the case of moving the operating body OB close to the operating body OB). By bringing the operating body OB into contact with the operating surface 1a, capacitance at a position of the operating surface 1a where the operating body OB is brought into contact changes. By detecting this change in capacitance with the detecting unit 2, which is a capacitive sensor, the operation performed on the operating surface 1a by the operating body OB is detected, and accordingly, the controller CT determines that an input operation is performed. When the operating body OB is moved in an arrow B direction illustrated in FIG. 12, the detecting unit 2 detects a change in capacitance occurring along the arrow B direction, and accordingly, outputs a signal indicating what the detecting unit 2 has detected to the controller CT. The controller CT determines that the input operation in which the operating body OB is moved in the arrow B direction is performed and issues an instruction in accordance with the input operation. For example, when the input apparatus with force feedback 100 is used in an application that moves a cursor displayed on a display screen (not illustrated), the controller CT issues an instruction for moving the cursor in a certain direction on the display screen corresponding to the arrow B direction to the display screen. Thus, the cursor is moved.

As illustrated in FIG. 13, the input apparatus with force feedback 100 allows a pressing operation in which the operating unit 1 is pressed downward (in the Z2 direction) against the elastic forces of the elastic members 4 to be performed. When the downward pressing operation is performed on the operating unit 1, the operating unit 1 and the actuator 3a of the drive member 3 connected to the operating unit 1 are moved downward. The operating unit 1 having been moved downward is brought into contact with the contact portion 6b (see FIG. 4) of the first damping member 6 and presses the first damping member 6 formed of a synthetic resin material, thereby deforming the first damping member 6. The pressure sensor disposed in the first damping member 6 detects a pressure value applied due to a pressure from the operating unit 1 and outputs the detected pressure value to the controller CT. Upon reception of the pressure value from the first damping member 6, the controller CT determines that the pressing operation is performed, and power to drive the drive member 3 is supplied. The actuator 3a of the drive member 3, to which the power is supplied, reciprocates in the vertical direction. Along with this reciprocation, the operating unit 1 is driven in the vertical direction, thereby applying vibration to the operator (operating body OB). By applying vibration to the operator as described above, the fact that performing of the pressing operation is recognized is fed back to the operator. For example, when the input apparatus with force feedback 100 is used in an application in which a cursor displayed on a display screen (not illustrated) is moved so as to select a certain icon from among a plurality of icons displayed on the display screen, the following processes are performed: the certain icon can be selected by operating the cursor so as to move the cursor onto the certain icon, and then performing the pressing operation on the operating unit 1. When the first damping member 6 outputs a detected pressure value, the controller CT issues an instruction for driving the drive member 3 so as to cause vibration to be applied to the operator through the operating unit 1. Thus, the fact that selection of the certain icon is recognized is fed back to the operator. At the same time, the controller CT issues an instruction in accordance with the operation of selecting the certain icon (such as displaying of a different image).

Furthermore, when the operating unit 1 is moved downward due to drive of the drive member 3, as is the case with the performing of the pressing operation, the elastic members 4 become compressed (collapsed) compared to those in the initial state, and upwardly pulling forces act on the operating unit 1 as illustrated in FIG. 13. Also, the first damping member 6 is downwardly compressed by contact with the operating unit 1, and an upwardly pulling force acts on the operating unit 1. In contrast, when the operating unit 1 is moved upward due to drive of the drive member 3, the elastic members 4 become extended compared to those in the initial state, and downwardly pulling forces act on the operating unit 1 as illustrated in FIG. 14. As the actuator 3a is driven upward, the second damping member 7 is brought into contact with the flat plate portion 3e of the actuator 3a and the casing member 3c so that the flat plate portion 3e is brought into contact with the lower surface of the casing member 3c with the second damping member 7 interposed therebetween and so that the second damping member 7 is compressed. Since the second damping member 7 is compressed in the vertical direction (in the Z1-Z2 direction) by the flat plate portion 3e and the casing member 3c, a downward pulling force acts on the flat plate portion 3e. The second damping member 7 may be disposed so as to be in contact with one of the flat plate portion 3e of the actuator 3a and the casing member 3c and so as to be brought into contact with and compressed by the other of the flat plate portion 3e of the actuator 3a and the casing member 3c as the actuator 3a is driven upward.

Furthermore, movements of the second damping member 7 along with the drive of the actuator 3a are described. As the actuator 3a is driven, the first contact portions 7e of the second damping member 7 are brought into contact with the other of the flat plate portion 3e and the casing member 3c, pressed against the other of the flat plate portion 3e and the casing member 3c, and bent, thereby causing the second contact portions 7h to be brought into contact with the other of the flat plate portion 3e and the casing member 3c and pressed against the other of the flat plate portion 3e and the casing member 3c. According to the first embodiment, the second damping member 7 in the initial state is held in a state in which, as illustrated in FIG. 15A, the first contact portions 7e are in contact with the casing member 3c and the third contact portions 7p are in contact with the flat plate portion 3e. Next, when the flat plate portion 3e is moved upward (in the Z1 direction) as the actuator 3a is driven from the initial state, as illustrated in FIG. 15B, the first contact portions 7e of the second damping member 7 in contact with the casing member 3c are pressed, and the skirt portion 7c is bent. When the skirt portion 7c is bent, the base portion 7b having the second contact portions 7h are moved upward, and the second contact portions 7h are brought into contact with the casing member 3c and pressed. Furthermore, as the skirt portion 7c is bent, part of air in the hollow portion 7d is moved through the through holes 7k to a side where the second inner wall portion 7m and the second outer wall portion 7n are provided. Thus, the movement of the air can be controlled in accordance with the sizes of the through holes 7k. This can serve the function of an air damper. Furthermore, when the flat plate portion 3e is moved to a lower position than that in the initial state as the actuator 3a is driven, as illustrated in FIG. 15C, the first contact portions 7e of the second damping member 7 are separated from the casing member 3c and moved downward with the flat plate portion 3e. The second damping member 7 is moved as described above as the actuator 3a is driven. Thus, the repulsive force produced by the second damping member 7 changes stepwise. That is, the repulsive force increases stepwise.

According to the first embodiment, the details of the instruction for driving the drive member 3 issued from the controller CT so as to provide feedback to the operator are as follows: As illustrated in FIG. 16, when the first damping member 6 outputs a pressure value P having been detected, the controller CT determines whether the pressure value P is greater or less than a first specified value P1 (step S1). If the pressure value P is less than the first specified value P1, processing performs step S1 again and determines whether the pressure value P is greater or less than the first specified value P1. If the pressure value P is greater than the first specified value P1, the controller CT outputs a signal SG1 that causes the drive member 3 to be driven (step S2), and the drive member 3 is driven (step S3). Then, after a specified time period has elapsed, the controller CT outputs a signal SG2 that causes the drive of the drive member 3 to be stopped (step S4), and the drive of the drive member 3 is stopped (step S5). Then, the controller CT determines whether the pressure value P is greater or less than a second specified value P2 (step S6). If the pressure value P is greater than the second specified value P2, the processing performs step S6 again and determines whether the pressure value P is greater or less than the second specified value P2. If the pressure value P is less than the second specified value P2, the controller CT outputs a signal SG1 that causes the drive member 3 to be driven (step S7), and the drive member 3 is driven (step S8). Then, after a specified time period has elapsed, the controller CT outputs a signal SG2 that causes the drive of the drive member 3 to be stopped (step S9), and the drive of the drive member 3 is stopped (step S10). Thus, feedback to the operator is completed. As has been described, by using the first specified value P1 to check the pressing operation performed by the operator, using the second specified value P2 to check removal of the operating body OB after the pressing operation by the operator has been performed, and providing feedback to the operator at two separate times, a quasi-click sensation, which mimics a click sensation that would be obtained when a dome-shaped spring plate is subjected to a pressing operation, is provided to the operator.

Effects produced by the first embodiment are described below.

The input apparatus with force feedback 100 according to the first embodiment includes the operating unit 1, the detecting unit 2, the drive member 3, the elastic member 4, and the base unit 5. The operating unit 1 includes the operating surface 1a, on which the operation can be performed by bringing the operating body OB into contact with or moving the operating body OB close to the operating surface 1a, on the upper surface of the operating unit 1. The detecting unit 2 detects the operation performed on the operating surface 1a by the operating body OB. The drive member 3 is provided below the operating unit 1 and drives the operating unit 1 in the vertical direction. The elastic member 4 is positioned below the operating unit 1 and elastically urges the operating unit 1 upward so as to support the operating unit 1. The base unit 5 holds the drive member 3. The drive member 3 includes the actuator 3a connected to the operating unit 1, the solenoid 3b that drives the actuator 3a in the vertical direction, and the casing member 3c that holds the solenoid 3b and the actuator 3a. The actuator 3a penetrates through the casing member 3c in the vertical direction and includes the first damping member 6 and the second damping member 7. The first damping member 6 has elasticity and is disposed at a position where the first damping member 6 is able to be brought into contact with the lower surface of the operating unit 1. The second damping member 7 has elasticity and is disposed between the upper surface or the lower surface of the casing member 3c and part of the actuator 3a. The second damping member 7 is brought into contact with at least one of the actuator 3a and the casing member 3c as the actuator 3a is driven.

Thus, the operating unit 1 elastically upwardly supported by the elastic members 4 can be vertically moved by the drive member 3. When the operating unit 1 is driven downward, as illustrated in FIG. 13, the operating unit 1 is brought into contact with the first damping member 6 at timing at which a driving direction changes to upward. At this time, the first damping member 6 absorbs an inertial force that attempts to move the operating unit 1 downward, and the operating unit 1 is urged upward by restoring forces that restore the compressed elastic members 4 to their original shapes. Accordingly, the drive member 3 can smoothly change the driving direction of the operating unit 1 from downward to upward. In contrast, when the operating unit 1 is driven upward, as illustrated in FIG. 14, at least one of the actuator 3a and the casing member 3c is brought into contact with the second damping member 7 at timing at which the drive direction changes to downward. According to the first embodiment, the second damping member 7 is interposed between the flat plate portion 3e of the actuator 3a and the casing member 3c and in contact with both the actuator 3a and the casing member 3c. At this time, the second damping member 7 absorbs an inertial force that attempts to move the operating unit 1 upward because the second damping member 7 is interposed between the flat plate portion 3e of the actuator 3a and the casing member 3c, and the operating unit 1 is urged downward by restoring forces that restore the extended elastic members 4 to their original shapes. Thus, the drive member 3 can smoothly change the driving direction of the operating unit 1 from upward to downward. By smoothly changing the driving direction of the operating unit 1 as described above, the operating unit 1 can be driven without unresponsiveness. Accordingly, the input apparatus with force feedback that provides a sharp operational sensation can be provided.

Furthermore, in the input apparatus with force feedback 100 according to the first embodiment, the actuator 3a preferably includes the column portion 3d that penetrates through the casing member 3c in the vertical direction and the flat plate portion 3e that projects from the end portion of the column portion 3d on the lower side so as to project along along the lower surface of the casing member 3c. In this case, the second damping member 7 is disposed between the flat plate portion 3e and the lower surface of the casing member 3c. The flat plate portion 3e is able to be brought into contact with the lower surface of the casing member 3c with the second damping member 7 interposed between the flat plate portion 3e and the lower surface of the casing member 3c.

Thus, with the structure in which the flat plate portion 3e is provided to the actuator 3a and the second damping member 7 is provided between the flat plate portion 3e and the casing member 3c, when the actuator 3a is driven and moved upward, the flat plate portion 3e is brought into contact with the lower surface of the casing member 3c with the second damping member 7 interposed therebetween. Thus, an inertial force that causes the actuator 3a to move upward can be absorbed by the second damping member 7, and accordingly, an inverting operation can be smoothly performed when the driving direction of the actuator 3a changes to downward.

Furthermore, in the input apparatus with force feedback 100 according to the first embodiment, preferably, the second damping member 7 has the insertion hole 7a that penetrates through the second damping member 7 in the vertical direction, and the second damping member 7 is disposed between the flat plate portion 3e and the lower surface of the casing member 3c with the column portion 3d inserted through the insertion hole 7a.

Thus, by disposing the second damping member 7 between the flat plate portion 3e and the lower surface of the casing member 3c with the column portion 3d inserted through the insertion hole 7a, removal of the second damping member 7 can be easily prevented.

Furthermore, in the input apparatus with force feedback 100 according to the first embodiment, as feedback to the pressing operation provided to the operator, the operating unit 1 is vibrated at two separate times so as to provide a quasi-click sensation.

Thus, the operator can obtain a clearer operational sensation and check whether or not an input operation performed by the operator is recognized by a tactile sensation.

Furthermore, in the input apparatus with force feedback 100 according to the first embodiment, a vibrating direction of the operating unit 1 of is a direction intersecting (perpendicular to) the operating surface 1a.

Thus, the operator can feel vibration more clearly than in the case where the vibrating direction of the operating unit 1 is a direction along the operating surface 1a.

Furthermore, in the input apparatus with force feedback 100 according to the first embodiment, preferably, the second damping member 7 has a discoid shape and includes the base portion 7b that has the insertion hole 7a at the central portion of the base portion, the skirt portion 7c that continuously extends toward one side in the vertical direction from the outer circumferential portion of the base portion 7b, and the hollow portion 7d that is covered by the base portion 7b and the skirt portion 7c and that has a substantially dome shape. In this case, the base portion 7b is in contact with one of the flat plate portion 3e and the casing member 3c on the other side of the base portion 7b in the vertical direction. The skirt portion 7c includes the first contact portions 7e that have an annular shape in plan view and that are disposed at the end portion of the skirt portion 7c on the side away from the base portion 7b such that the first contact portions 7e are able to be brought into contact with the other of the flat plate portion 3e and the casing member 3c. The inner wall portion (first inner wall portion 7f) and the outer wall portion (first outer wall portion 7g) are provided on the base portion 7b so as to be perpendicular to the base portion 7b in the hollow portion 7d. The first inner wall portion 7f has an annular shape surrounding the insertion hole 7a in plan view. The first outer wall portion 7g is formed between the skirt portion 7c and the inner wall portion 7f and has an annular shape surrounding the first inner wall portion 7f in plan view. The second contact portions 7h are formed at the end portions of the first inner wall portion 7f and the first outer wall portion 7g on the side away from the base portion 7b so as to be able to be brought into contact with the other of the flat plate portion 3e and the casing member 3c and positioned closer to the base portion 7b than the first contact portions 7e. The through holes 7k are formed in the region of the base portion 7b interposed between the first inner wall portion 7f and the first outer wall portion 7g. As the actuator 3a is driven, the first contact portions 7e are brought into contact with the other of the flat plate portion 3e and the casing member 3c, pressed against the other of the flat plate portion 3e and the casing member 3c, and bent, thereby causing the second contact portions 7h to be brought into contact with the other of the flat plate portion 3e and the casing member 3c and pressed against the other of the flat plate portion 3e and the casing member 3c.

Thus, the first contact portions 7e and the second contact portions 7h are brought into contact with the other of the flat plate portion 3e and the casing member 3c stepwise. This can change the repulsive force produced by the second damping member 7 stepwise. That is, the repulsive force can increase stepwise. By changing the repulsive force stepwise as described above, the vibration can be efficiently converged. Also, with the first inner wall portion 7f, the first outer well portion 7g, and the through holes 7k (air-bleeding holes), when the second contact portions 7h are brought into contact with the other of the flat plate portion 3e and the casing member 3c, air in the hollow portion 7d is moved through the through holes 7k, so that the function similar to or the same as an air damper is provided. Accordingly, the vibration can be efficiently converged.

Although the input apparatus with force feedback according to the embodiment of the present invention has been specifically described, the present invention is not limited to the above-described embodiment. The present invention can be implemented with a variety of changes without departing from the gist of the present invention. For example, the present invention can be implemented with changes as described below. It should be understood that embodiments with these changes also belong to the technical scope of the present invention.

According to the first embodiment, the second damping member 7 is disposed between the lower surface of the casing member 3c and the flat plate portion 3e, which is part of the actuator 3a. Alternatively, the flat plate portion 3e may be provided above the upper surface of the casing member 3c, and the second damping member 7 may be disposed between the upper surface of the casing member 3c and the actuator 3a.

According to the first embodiment, the second damping member 7 is interposed between the flat plate portion 3e of the actuator 3a and the lower surface of the casing member 3c and brought into contact with both the actuator 3a and the casing member 3c as the actuator 3a is driven. However, it is sufficient that the second damping member 7 be brought into contact with at least one of the actuator 3a and the casing member 3c.

According to the first embodiment, as feedback to the pressing operation provided to the operator, the operating unit 1 is vibrated at two separate times so as to provide a quasi-click sensation. However, the operating unit 1 may be vibrated once or at the number of separate times more than two times. Furthermore, the first specified value P1 and the second specified value P2 may be changed. By changing the first specified value P1 and the second specified value P2 as described above, the operational sensation can be changed or adjusted in accordance with applications.

What is claimed is:

1. An input apparatus with force feedback, the apparatus comprising:
    an operating unit that includes an operating surface, on which an operation is performed by bringing an operating body into contact with or moving the operating body close to the operating surface, on an upper surface of the operating unit;
    a detecting unit that detects the operation performed on the operating surface by the operating body;

a drive member provided below the operating unit, the drive member driving the operating unit in a vertical direction;

an elastic member positioned below the operating unit, the elastic member elastically urging the operating unit upward so as to support the operating unit; and a base unit that holds the drive member, wherein the drive member includes:
an actuator connected to the operating unit,
a solenoid that drives the actuator in the vertical direction, and
a casing member that holds the solenoid and the actuator, wherein the actuator penetrates through the casing member in the vertical direction and includes:
a first damping member that has elasticity and that is disposed at a position where the first damping member is able to be brought into contact with a lower surface of the operating unit, and
a second damping member that has elasticity and is disposed between an upper surface or a lower surface of the casing member and part of the actuator, and wherein the second damping member is brought into contact with at least one of the actuator and the casing member as the actuator is driven.

2. The input apparatus with force feedback according to claim 1,
wherein the actuator includes:
a column portion that penetrates through the casing member in the vertical direction, and
a flat plate portion that projects from an end portion of the column portion on a lower side so as to extend along the lower surface of the casing member,
wherein the second damping member is disposed between the flat plate portion and the lower surface of the casing member, and
wherein the flat plate portion is able to be brought into contact with the lower surface of the casing member with the second damping member interposed between the flat plate portion and the lower surface of the casing member.

3. The input apparatus with force feedback according to claim 2,
wherein the second damping member has an insertion hole that penetrates through the second damping member in the vertical direction, and the second damping member is disposed between the flat plate portion and the lower surface of the casing member with the column portion inserted through the insertion hole.

4. The input apparatus with force feedback according to claim 3,
wherein the second damping member has a discoid shape and includes:
a base portion that has the insertion hole at a central portion of the base portion,
a skirt portion that continuously extends toward one side in the vertical direction from an outer circumferential portion of the base portion, and
a hollow portion that is covered by the base portion and the skirt portion and that has a substantially dome shape,
wherein the base portion is in contact with one of the flat plate portion and the casing member on the other side of the base portion in the vertical direction,
wherein the skirt portion includes a first contact portion that has an annular shape in plan view and that is disposed at an end portion of the skirt portion on a side away from the base portion such that the first contact portion is able to be brought into contact with the other of the flat plate portion and the casing member,
wherein an inner wall portion and an outer wall portion are provided in the hollow portion so as to be perpendicular to the base portion,
wherein the inner wall portion has an annular shape surrounding the insertion hole in plan view,
wherein the outer wall portion is between the skirt portion and the inner wall portion and has an annular shape surrounding the inner wall portion in plan view,
wherein second contact portions are at end portions of the inner wall portion and the outer wall portion on the side away from the base portion so as to be able to be brought into contact with the other of the flat plate portion and the casing member and positioned closer to the base portion than the first contact portion,
wherein a through hole is in a region of the base portion interposed between the inner wall portion and the outer wall portion, and
wherein, as the actuator is driven, the first contact portion is brought into contact with the other of the flat plate portion and the casing member, pressed against the other of the flat plate portion and the casing member, and bent, thereby causing the second contact portions to be brought into contact with the other of the flat plate portion and the casing member and pressed against the other of the flat plate portion and the casing member.

* * * * *